US012753260B2

United States Patent
(12) United States Patent
Pagano et al.

(10) Patent No.: US 12,753,260 B2
(45) Date of Patent: Oct. 6, 2026

(54) RUBBER COMPOSITION COMPRISING A POLYPHENYLENE ETHER RESIN

(71) Applicant: COMPAGNIE GENERALE DES ETABLISSEMENTS MICHELIN, Clermont-Ferrand (FR)

(72) Inventors: Salvatore Pagano, Clermont-Ferrand (FR); Cedric Roudet, Clermont-Ferrand (FR); Nicolas Waeckerle, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 705 days.

(21) Appl. No.: 17/786,362

(22) PCT Filed: Dec. 10, 2020

(86) PCT No.: PCT/FR2020/052371

§ 371 (c)(1),
(2) Date: Jun. 16, 2022

(87) PCT Pub. No.: WO2021/123573

PCT Pub. Date: Jun. 24, 2021

(65) Prior Publication Data

US 2023/0036094 A1 Feb. 2, 2023

(30) Foreign Application Priority Data

Dec. 18, 2019 (FR) ...................................... 1914741

(51) Int. Cl.

| | |
|---|---|
| ***C08K 3/36*** | (2006.01) |
| ***B60C 1/00*** | (2006.01) |
| ***C08F 212/08*** | (2006.01) |
| ***C08F 236/06*** | (2006.01) |
| ***C08F 236/08*** | (2006.01) |
| ***C08G 65/48*** | (2006.01) |

(52) U.S. Cl.

CPC .......... *C08F 236/06* (2013.01); *B60C 1/0016* (2013.01); *C08F 212/08* (2013.01); *C08G 65/485* (2013.01); *C08K 3/36* (2013.01); *C08F 2500/32* (2021.01)

(58) Field of Classification Search

CPC ........ C08F 236/08; C08F 212/08; C08K 3/36; C08G 65/48; B60C 1/00

USPC .......................................................... 523/156

See application file for complete search history.

(56) References Cited

U.S. PATENT DOCUMENTS

| | | | |
|---|---|---|---|
| 4,588,806 A | 5/1986 | Aycock et al. | |
| 5,977,238 A | 11/1999 | Labauze | |
| 6,013,718 A | 1/2000 | Cabioch et al. | |
| 6,503,973 B2 | 1/2003 | Robert et al. | |
| 6,815,473 B2 | 11/2004 | Robert et al. | |
| 7,199,175 B2 | 4/2007 | Vasseur | |
| 7,250,463 B2 | 7/2007 | Durel et al. | |
| 7,312,264 B2 | 12/2007 | Gandon-Pain | |
| 7,825,183 B2 | 11/2010 | Robert et al. | |
| 7,834,074 B2 | 11/2010 | Brunelet et al. | |
| 7,882,874 B2 | 2/2011 | Robert et al. | |
| 7,900,667 B2 | 3/2011 | Vasseur | |
| 8,324,310 B2 | 12/2012 | Robert et al. | |
| 9,822,247 B2 | 11/2017 | Abad | |
| 10,435,544 B2 | 10/2019 | Abad | |
| 11,241,370 B2 | 2/2022 | Valero et al. | |
| 2001/0036991 A1 | 11/2001 | Robert et al. | |
| 2002/0183436 A1 | 12/2002 | Robert et al. | |
| 2003/0212185 A1 | 11/2003 | Vasseur | |
| 2005/0004297 A1 | 1/2005 | Durel et al. | |
| 2005/0032965 A1 | 2/2005 | Valero | |
| 2006/0089445 A1 | 4/2006 | Gandon-Pain | |
| 2007/0112120 A1 | 5/2007 | Vasseur | |
| 2008/0009564 A1 | 1/2008 | Robert et al. | |
| 2008/0156404 A1 | 7/2008 | Brunelet et al. | |
| 2009/0292063 A1 | 11/2009 | Robert et al. | |
| 2010/0204359 A1 | 8/2010 | Robert et al. | |
| 2010/0221541 A1 | 9/2010 | Valero et al. | |
| 2011/0263784 A1 | 10/2011 | Valero et al. | |
| 2013/0116376 A1* | 5/2013 | Custodero ................. | C08L 9/06 524/526 |
| 2016/0319114 A1 | 11/2016 | Abad | |
| 2016/0319115 A1* | 11/2016 | Abad .................... | B60C 1/0016 |
| 2021/0230401 A1 | 7/2021 | Abad et al. | |

FOREIGN PATENT DOCUMENTS

| | | |
|---|---|---|
| EP | 1127909 A1 | 8/2001 |
| FR | 2740778 A1 | 5/1997 |
| FR | 2765882 A1 | 1/1999 |

(Continued)

OTHER PUBLICATIONS

International Search Report dated Jan. 28, 2021, in corresponding PCT/FR2020/052371 (4 pages).

S. Brunauer, et al., "Adsorption of Gases in Multimolecular Layers", J. Am. Chem. Soc., vol. 60, pp. 309-319 (1938).

Ullman's Encyclopedia of Industrial Chemistry, 5th ed., VCH, New York, vol. A21, pp. 605-614 (1992).

S.C. Shit, et al., "Application of NMR Spectroscopy in Molecular Weight Determination of Polymers", Eur. Polym. J., vol. 22, No. 12, pp. 1001-1008 (1986).

*Primary Examiner* — Deve V Hall

(74) *Attorney, Agent, or Firm* — VENABLE LLP

(57) ABSTRACT

A rubber composition is based on at least one predominant vinylaromatic diene elastomer, having a vinylaromatic content of less than 10%; from 3 to 50 phr of a thermoplastic resin, denoted PPE resin, comprising optionally substituted polyphenylene ether units, the resin having a number-average molecular weight (Mn) of less than 6000 g/mol; from 5 to 60 phr of silica as predominant reinforcing filler; and a crosslinking system. Also disclosed are rubber articles comprising such a composition and in particular tires.

14 Claims, No Drawings

(56) References Cited

FOREIGN PATENT DOCUMENTS

| | | | |
|---|---|---|---|
| FR | 2866028 | A1 | 8/2005 |
| FR | 2877348 | A1 | 5/2006 |
| FR | 2889538 | A1 | 2/2007 |
| WO | 97/36724 | A2 | 10/1997 |
| WO | 99/16600 | A1 | 4/1999 |
| WO | 01/92402 | A1 | 12/2001 |
| WO | 02/10269 | A2 | 2/2002 |
| WO | 03/016215 | A1 | 2/2003 |
| WO | 03/016387 | A1 | 2/2003 |
| WO | 2004/096865 | A2 | 11/2004 |
| WO | 2015/091918 | A1 | 6/2015 |
| WO | 2015/091921 | A1 | 6/2015 |
| WO | 2019/077272 | A1 | 4/2019 |

* cited by examiner

RUBBER COMPOSITION COMPRISING A POLYPHENYLENE ETHER RESIN

The present invention relates to rubber compositions intended in particular for the manufacture of rubber articles such as tires or semi-finished products for tires. In particular, the invention relates to rubber compositions for tire treads having good endurance and good wear resistance. Tires are subjected to numerous stresses during the use thereof. Tire treads especially must respond to a large number of often conflicting technical requirements, including low rolling resistance, high wear resistance and good dry and wet grip.

BACKGROUND

It is known practice to use elastomers combined with reinforcing fillers and plasticizing agents in tire compositions. Conventionally, these plasticizing agents may be plasticizing oils or plasticizing resins, such as described in numerous documents, for example in patent applications FR 2 866 028, FR 2 877 348 or FR 2 889 538, describing especially the use of thermoplastic resins as plasticizing resins.

Also, documents WO 2015/091918, WO 2015/091921 and WO 2019/077272 describe compositions for tires comprising a polyphenylene ether resin, denoted PPE resin, which makes it possible to improve the performance compromise between the ease of manufacture of the mixtures and the tire grip. Moreover, the use of these thermoplastic resins based on optionally substituted polyphenylene ether units makes it possible to reduce the amount of resin compared to conventional thermoplastic plasticizing resins, which makes possible a reduction in the green tack of the compositions which is linked to the use of these resins, and therefore facilitates the manufacture of tires comprising these compositions.

Presently, the applicant has found that it is possible to derive full benefit from compositions comprising a vinylaromatic diene elastomer and a PPE resin, while achieving excellent wear resistance performance, thanks to a specific combination of reinforcing filler and specific elastomer in these compositions.

SUMMARY

Consequently, a first object of the invention relates to a rubber composition based on at least one predominant vinylaromatic diene elastomer, having a vinylaromatic content of less than 10%; from 3 to 50 phr of a thermoplastic resin, denoted PPE resin, comprising optionally substituted polyphenylene ether units, said resin having a number-average molecular weight (Mn) of less than 6000 g/mol; from 5 to 60 phr of silica as predominant reinforcing filler; and a crosslinking system.

Another subject of the invention is finished or semi-finished rubber articles comprising a rubber composition in accordance with the invention.

Another subject of the invention is tires comprising a rubber composition in accordance with the invention, and especially tires in which the tread comprises a rubber composition according to the invention.

The tires in accordance with the invention are especially intended for passenger vehicles as well as for two-wheel vehicles (motorcycles, bicycles), industrial vehicles selected from vans, "heavy-duty" vehicles—i.e. underground, bus, heavy road transport vehicles (lorries, tractors, trailers), off-road vehicles, heavy agricultural vehicles or earthmoving equipment, aircraft, and other transportation or handling vehicles.

The invention and its advantages will be easily understood in the light of the description and implementational examples which follow.

DETAILED DESCRIPTION

Rubber Compositions of the Invention

The rubber composition according to the invention is based on at least one predominant vinylaromatic diene elastomer, having a vinylaromatic content of less than 10%; from 3 to 50 phr of a thermoplastic resin, denoted PPE resin, comprising optionally substituted polyphenylene ether units, said resin having a number-average molecular weight (Mn) of less than 6000 g/mol; from 5 to 60 phr of silica as predominant reinforcing filler; and a crosslinking system.

The expression "composition based on" should be understood as meaning a composition comprising the mixture and/or the product of the in situ reaction of the various constituents used, some of these constituents being able to react and/or being intended to react with one another, at least partially, during the various phases of manufacture of the composition; it thus being possible for the composition to be in the completely or partially crosslinked state or in the noncrosslinked state.

In the present description, unless expressly indicated otherwise, all the percentages (%) shown are percentages (%) by weight.

Furthermore, any interval of values denoted by the expression "between a and b" represents the range of values extending from more than a to less than b (that is to say, limits a and b excluded), while any interval of values denoted by the expression "from a to b" means the range of values extending from a up to b (that is to say, including the strict limits a and b).

When reference is made to a "predominant" compound, this is understood to mean, for the purposes of the present invention, that this compound is predominant among the compounds of the same type in the composition, that is to say that it is the one which represents the greatest amount by weight among the compounds of the same type. Thus, for example, a predominant elastomer is the elastomer representing the greatest weight relative to the total weight of the elastomers in the composition. In the same way, a "predominant" filler is that representing the greatest weight among the fillers of the composition. By way of example, in a system comprising just one elastomer, the latter is predominant for the purposes of the present invention and, in a system comprising two elastomers, the predominant elastomer represents more than half of the weight of the elastomers. Preferably, the term "predominant" is understood to mean present at more than 50%, preferably more than 60%, 70%, 80%, 90%, and more preferentially the "predominant" compound represents 100%.

Similarly, for the purposes of the present invention, when reference is made to a "predominant" monomer unit within one and the same polymer, this means that this monomer unit is predominant among the monomer units forming the polymer, that is to say that it is the one which represents the greatest weight fraction among the monomer units forming the polymer.

Thus, for example, a resin predominantly composed of units resulting from dicyclopentadiene and aromatic monomers is a resin in which the dicyclopentadiene units added to the aromatic units represent the largest weight amount among all the units making up said resin. In other words, a "predominant" monomer or an assembly of "predominant" monomers is a monomer (or an assembly of monomers) which represents the largest weight fraction in the polymer. Conversely, a "minor" monomer is a monomer which does not represent the largest molar fraction in the polymer.

The carbon-comprising compounds mentioned in the description can be of fossil or biobased origin. In the latter case, they can partially or completely result from biomass or be obtained from renewable starting materials resulting from biomass. Polymers, plasticizers, fillers, and the like, are concerned in particular.

I.1. Elastomers

The rubber composition according to the invention comprises a predominant vinylaromatic diene elastomer, having a vinylaromatic content of less than 10%.

The term "diene" elastomer or rubber should be understood, in a known way, as meaning an (one or more is understood) elastomer resulting at least in part (i.e., a homopolymer or a copolymer) from diene monomers (monomers bearing two conjugated or non-conjugated carbon-carbon double bonds).

These definitions being given, the term "vinylaromatic diene elastomer" more particularly means any copolymer obtained by copolymerization of one or more conjugated dienes with one another or with one or more vinylaromatic compounds having from 8 to 20 carbon atoms. The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, aryl-1,3-butadiene, 1,3-pentadiene or 2,4-hexadiene.

The following, for example, are suitable as vinylaromatic compounds: styrene, α-methylstyrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers may have any microstructure, which depends on the polymerization conditions used, notably on the presence or absence of a modifying and/or randomizing agent and on the amounts of modifying and/or randomizing agent used. The elastomers can, for example, be block, random, sequential or microsequential elastomers and can be prepared in dispersion or in solution; they can be coupled and/or star-branched or else functionalized by a coupling and/or star-branching or functionalization agent. For coupling to carbon black, examples that may be mentioned include functional groups comprising a C—Sn bond or aminated functional groups, such as benzophenone, for example; for coupling to a reinforcing inorganic filler, such as silica, examples that may be mentioned include silanol functional groups or polysiloxane functional groups having a silanol end (as described, for example, in FR 2 740 778 or U.S. Pat. No. 6,013,718), alkoxysilane groups (as described, for example, in FR 2 765 882 or U.S. Pat. No. 5,977,238), carboxyl groups (as described, for example, in WO 01/92402 or U.S. Pat. No. 6,815,473, WO 2004/096865 or US 2006/0089445) or else polyether groups (as described, for example, in EP 1 127 909 or U.S. Pat. No. 6,503,973). Mention may also be made, as other examples of functionalized elastomers, of vinylaromatic diene elastomers (such as SBR) of the epoxidized type.

Preferably, the vinylaromatic diene elastomer of the composition in accordance with the invention is selected from the group consisting of butadiene/styrene copolymers, isoprene/styrene copolymers and butadiene/isoprene/styrene copolymers and mixtures of these elastomers, and preferably from the group consisting of butadiene/styrene copolymers and mixtures of the latter.

Preferentially, the present vinylaromatic diene elastomer has a vinylaromatic unit content of between 0% and 5% by weight and a Tg within a range extending from −110° C. to −70° C. Thus, these copolymers of diene and vinylaromatic monomer can contain from 9% to less than 100% by weight of diene units and from more than 0% to 5% by weight of vinylaromatic units.

The vinylaromatic diene elastomer can be coupled and/or star-branched or functionalized by a group introduced via a coupling and/or star-branching or functionalization agent known to those skilled in the art. This group can be located at the end of the linear main elastomer chain. It will then be said that the diene elastomer is functionalized at the chain end or extremity. It is generally an elastomer obtained by reaction of a living elastomer with a functionalization agent, that is to say any at least monofunctional molecule, the functional group being any type of chemical group known by those skilled in the art to react with a living chain end.

This group can be located in the linear main elastomer chain. It will then be said that the diene elastomer is coupled or else functionalized in the middle of the chain, in contrast to the position "at the chain end" and although the group is not located precisely at the middle of the elastomer chain. It is generally an elastomer obtained by reaction of two chains of the living elastomer with a coupling agent, that is to say any at least difunctional molecule, the functional group being any type of chemical group known by those skilled in the art to react with a living chain end.

This group can be central, to which n elastomer chains (n>2) are bonded, forming a star-branched structure. It will then be said that the diene elastomer is star-branched. It is generally an elastomer obtained by reaction of n chains of the living elastomer with a star-branching agent, that is to say any polyfunctional molecule, the functional group being any type of chemical group known by those skilled in the art to react with a living chain end.

Those skilled in the art will understand that a functionalization reaction with an agent comprising more than one functional group which is reactive with regard to the living elastomer results in a mixture of entities functionalized at the chain end and in the middle of the chain, constituting the linear chains of the functionalized elastomer, and also, if appropriate, star-branched entities. Depending on the operating conditions, mainly the molar ratio of the functionalization agent to the living chains, certain entities are predominant in the mixture.

Preferentially, for the requirements of the invention, the vinylaromatic diene elastomer has a Tg within a range extending from −110° C. to −80° C., preferably from −95° C. to −80° C.

Preferably again, the vinylaromatic diene elastomer has a Mooney viscosity within a range extending from 50 to 80. In the present description, Mooney viscosity is understood to mean the ML(1+4)100° C. Mooney viscosity of a compound, in particular of the vinylaromatic diene elastomer of use in the invention, measured according to Standard ASTM D1646.

According to one preferred embodiment, the vinylaromatic diene elastomer has a vinylaromatic unit content of from 1% to 4% by weight relative to the total weight of the copolymer, and also a vinyl unit content relative to the diene portion ranging from 8% to 15% by weight, preferably ranging from 10% to 15% by weight.

Preferably, at least 70% by weight of the vinylaromatic diene elastomer is functionalized, preferably by an alkoxysilane group, optionally partially or completely hydrolysed to give silanol, the alkoxysilane group bearing or not bearing another functional group capable of interacting with a reinforcing filler, the alkoxysilane group being bonded to the diene elastomer via the silicon atom. Preferentially, the vinylaromatic diene elastomer is functionalized mainly in the middle of the chain. The microstructure of these elastomers can be determined by the presence or absence of a polar agent and the amounts of polar agent employed during the anionic polymerization step. Preferably, when the diene elastomer is based on a diene and on styrene, a polar agent is used during the polymerization step in amounts such that it promotes the random distribution of the styrene along the polymer chains while retaining the content of 1,2-bonds at preferably between 8% and 15%, preferably from 10% to 15%.

The term "alkoxysilane group which interacts favourably with the reinforcing filler" or "functional group capable of interacting with a reinforcing filler" is understood to mean any alkoxysilane group or other functional group, preferably amine functional group, capable of forming, within a rubber composition reinforced by means of a filler, a physical or chemical bond with said filler. This interaction can be established, for example, via covalent, hydrogen, ionic and/or electrostatic bonds between said functional group and functional groups present on fillers.

The alkoxy radical of the alkoxysilane group can be of formula R'O—, where R' represents a substituted or unsubstituted $C_1$-$C_{10}$, indeed even $C_1$-$C_8$, alkyl group, preferably a $C_1$-$C_4$ alkyl group, more preferably methyl and ethyl.

The other function as mentioned above may for example be an amine, a thiol, or a polyether or polyoxyethylene group. Very preferably, the other functional group capable of interacting with a reinforcing filler is a primary, secondary or tertiary amine. This variant of the invention is particularly advantageous as a result of the improvement in the hysteresis properties.

In the present description, primary or secondary amine is understood to mean a primary or secondary amine which is or is not protected by a protective group known to those skilled in the art.

Mention may be made, as secondary or tertiary amine functional group, of amines substituted by $C_1$-$C_{10}$, preferably $C_1$-$C_4$, alkyl radicals, more preferably a methyl or ethyl radical, or else cyclic amines forming a heterocycle comprising a nitrogen atom and at least one carbon atom, preferably from 2 to 6 carbon atoms. For example, the methylamino-, dimethylamino-, ethylamino-, diethylamino-, propylamino-, dipropylamino-, butylamino-, dibutylamino-, pentylamino-, dipentylamino-, hexylamino-, dihexylamino- or hexamethyleneamino-groups, preferably the diethylamino- and dimethylamino-groups, are suitable.

Preferably, the functional group capable of interacting with a reinforcing filler is a tertiary amine functional group, preferably diethylamine or dimethylamine.

According to a variant of the invention, the functional group, preferably primary, secondary or tertiary amine functional group, capable of interacting with a reinforcing filler is directly bonded to the silicon atom, itself directly bonded to the diene elastomer.

According to another variant of the invention, the functional group, preferentially primary, secondary or tertiary amine functional group, capable of interacting with a reinforcing filler and the silicon atom bonded to the diene elastomer are connected together by a spacer group which can be an atom or a group of atoms. The spacer group can be a saturated or unsaturated, cyclic or non-cyclic, linear or branched, divalent $C_1$-$C_{18}$ aliphatic hydrocarbon-based radical or a divalent $C_6$-$C_{18}$ aromatic hydrocarbon-based radical and can contain one or more aromatic radicals and/or one or more heteroatoms. The hydrocarbon-based radical can optionally be substituted.

Preferably, the vinylaromatic diene elastomer comprises more than 0% and up to 30% by weight (more preferentially between 0% and 20%), relative to the total weight of the vinylaromatic diene elastomer, of a star-branched vinylaromatic diene elastomer.

The compositions of the invention may contain a single vinylaromatic diene elastomer or a mixture of several vinylaromatic diene elastomers, with the vinylaromatic diene elastomer(s), always predominant, being able to be used in combination with any other elastomer known to those skilled in the art, such as for example a natural rubber (NR) or a polybutadiene (BR).

The content of vinylaromatic diene elastomer is within a range extending from 70 to 100 phr, more preferably from 85 to 100 phr, and very preferably this content is 100 phr, that is to say that there are only vinylaromatic diene elastomers in the composition.

I.2. PPE Resin

The composition according to the invention comprises from 3 to 50 phr of a thermoplastic resin based on optionally substituted polyphenylene ether units (abbreviated to "PPE resin"). This type of compound is described, for example, in the encyclopedia "Ullmann's Encyclopedia of Industrial Chemistry", published by VCH, vol. A 21, pages 605-614, 5th edition, 1992.

In a known way, PPE resins usually have number-average molecular weights (Mn) which are variable, most often from 15 000 to 30 000 g/mol; in the case of high weights such as these, Mn is measured in a way known to those skilled in the art by SEC (also referred to as GPC, as in reference U.S. Pat. No. 4,588,806, column 8).

For the requirements of the invention, a PPE resin having a weight Mn less than the weights usually encountered and especially less than 6000 g/mol, preferably less than 3500 g/mol and more preferentially within a range extending from 700 to 2500 g/mol is used for the composition of the invention. The number-average molecular weight (Mn) of the PPEs with a weight less than 6000 g/mol is measured by NMR, since the conventional SEC measurement is not precise enough. This NMR measurement is carried out in a way known to those skilled in the art, either by assaying the chain end functions or by assaying the polymerization initiators, as explained for example in "Application of NMR spectroscopy in molecular weight determination of polymers" by Subhash C. Shit and Sukumar Maiti in "European Polymer Journal" vol. 22, no. 12, pages 1001 to 1008 (1986).

Preferably, the value of the polydispersity index PI (reminder: PI=Mw/Mn, with Mw the weight-average molecular weight and Mn the number-average molecular weight) of the PPE resin is less than or equal to 5, more preferably less than or equal to 3 and more preferably still less than or equal to 2.

The PPE resin useful for the purposes of the invention preferentially has a glass transition temperature (Tg), measured by DSC according to Standard ASTM D3418 of 1999, within a range extending from 0 to 170° C., preferably from 120 to 170° C. Below 0° C. and above 170° C., the technical effect of the invention is not optimal.

Preferably, the PPE resin is a compound comprising predominantly polyphenylene units of general formula (I):

(I)

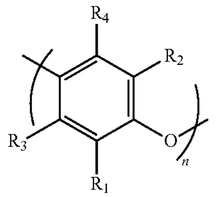

in which:

$R_1$, $R_2$, $R_3$ and $R_4$ represent, independently of one another, identical or different groups selected from hydrogen; hydroxyl, alkoxy, halogen, amino, alkylamino or dialkylamino groups; hydrocarbon-based groups comprising at least 1 carbon atom, optionally interrupted by heteroatoms and optionally substituted; $R_1$ and $R_3$ on the one hand, and $R_2$ and $R_4$ on the other hand, may form, together with the carbon atoms to which they are attached, one or more rings fused to the benzene ring of the compound of formula (I), n is an integer within a range extending from 3 to 300.

Preferentially, $R_1$, $R_2$, $R_3$ and $R_4$ represent, independently of one another, identical or different groups selected from:

hydrogen, hydroxyl, alkoxy, halogen, amino, alkylamino or dialkylamino groups, linear, branched or cyclic alkyl groups, comprising from 1 to 25 carbon atoms (preferably from 2 to 18), which are optionally interrupted by heteroatoms selected from nitrogen, oxygen and sulfur and optionally substituted by hydroxyl, alkoxy, amino, alkylamino, dialkylamino or halogen groups, aryl groups comprising from 6 to 18 carbon atoms (preferably from 6 to 12), optionally substituted by hydroxyl, alkoxy, amino, alkylamino, dialkylamino, alkyl or halogen groups.

More preferably, $R_1$, $R_2$, $R_3$ and $R_4$ represent, independently of one another, identical or different groups selected from:

hydrogen, hydroxyl groups, alkoxy groups comprising from 1 to 6 carbon atoms, halogen groups, amino groups, alkylamino groups comprising from 1 to 6 carbon atoms or dialkylamino groups comprising from 2 to 12 carbon atoms, linear, branched or cyclic alkyl groups, comprising from 1 to 12 carbon atoms (preferably from 2 to 6), optionally interrupted by heteroatoms and optionally substituted by hydroxyl groups, alkoxy groups comprising from 1 to 6 carbon atoms, amino groups, alkylamino groups comprising from 1 to 6 carbon atoms, dialkylamino groups comprising from 2 to 12 carbon atoms, or halogen groups, aryl groups comprising from 6 to 18 carbon atoms (preferably from 6 to 12) which are optionally substituted by hydroxyl groups, alkoxy groups comprising from 1 to 6 atoms, amino groups, alkylamino groups comprising from 1 to 6 atoms, dialkylamino groups comprising from 2 to 12 carbon atoms, alkyl groups comprising from 1 to 12 carbon atoms, or halogen groups.

More preferably still, $R_1$ and $R_2$ represent an alkyl group and in particular a methyl group, and $R_3$ and $R_4$ represent hydrogen atoms. In this case, the PPE resin is a poly(2,6-dimethyl-1,4-phenylene ether).

Preferably also, n is an integer within a range extending from 3 to 50, more preferably from 5 to 30 and preferably from 6 to 20.

Preferably, the PPE resin is a compound comprising to more than 80% by weight, and more preferably still to more than 95% by weight, of polyphenylene units of general formula (I).

Mention may be made, as examples, of poly(2,6-dimethyl-1,4-phenylene ether) and in particular Noryl SA 120 or Noryl SA 90 from Sabic.

The content of PPE resin in the composition is preferentially within a range extending from 3 to 40 phr, preferably from 5 to 30 phr, more preferentially from 5 to 20 phr.

I.3. Reinforcing Filler

The rubber composition of the invention comprises from 5 to 60 phr of silica as predominant reinforcing filler.

Preferably, the content of silica is within a range extending from 10 to 50 phr, more preferentially from 15 to 40 phr.

The silica used can be any reinforcing silica known to those skilled in the art, in particular any precipitated or fumed silica exhibiting a BET specific surface area and a CTAB specific surface area both of less than 450 $m^2/g$, preferably within a range extending from 30 to 400 $m^2/g$, in particular from 60 to 300 $m^2/g$.

In the present disclosure, the BET specific surface area is determined by gas adsorption using the Brunauer-Emmett-Teller method described in "The Journal of the American Chemical Society", (Vol. 60, page 309, February 1938), and more specifically according to a method derived from Standard NF ISO 5794-1, Appendix E, of June 2010 [multipoint (5 point) volumetric method—gas: nitrogen—degassing under vacuum: one hour at 160° C.—relative pressure p/po range: 0.05 to 0.17].

For the inorganic fillers, such as silica, for example, the CTAB specific surface area values were determined according to Standard NF ISO 5794-1, Appendix G, of June 2010. The process is based on the adsorption of CTAB (N-hexadecyl-N,N,N-trimethylammonium bromide) on the "external" surface of the reinforcing filler.

Any type of precipitated silica, in particular highly dispersible precipitated silicas (referred to as "HDS" for "highly dispersible silica"), can be used. These precipitated silicas, which are or are not highly dispersible, are well known to those skilled in the art. Mention may be made, for example, of the silicas described in applications WO03/016215-A1 and WO03/016387-A1.

Use may in particular be made, among commercial HDS silicas, of the Ultrasil 5000GR or Ultrasil 7000GR silicas from Evonik or the Zeosil 1085GR, Zeosil 1115MP, Zeosil 1165MP, Zeosil Premium 200MP or else Zeosil HRS 1200 MP silicas from Solvay. As non-HDS silica, the following commercial silicas can be used: Ultrasil VN2GR or Ultrasil VN3GR from Evonik, Zeosil 175GR from Solvay, Hi-Sil EZ120G(-D), Hi-Sil EZ160G(-D), Hi-Sil EZ200G(-D), Hi-Sil 243LD, Hi-Sil 210, Hi-Sil HDP 320G from PPG.

The physical state in which the silica is provided is not important, whether it be in the form of a powder, of microbeads, of granules, or else of beads or any other appropriate densified form. Those skilled in the art will know how to adjust the contents of reinforcing fillers according to the use concerned, in particular according to the type of tires concerned, for example a tire for a motorcycle, for a passenger vehicle or for a utility vehicle, such as a van or heavy-duty vehicle.

In order to couple the silica to the diene elastomer, use may be made, in a well-known way, of an at least bifunctional coupling agent (or bonding agent) intended to provide a satisfactory connection, of chemical and/or physical nature, between the silica (surface of its particles) and the diene elastomer. Use is made in particular of organosilanes or polyorganosiloxanes which are at least bifunctional. The term "bifunctional" is understood to mean a compound having a first functional group capable of interacting with the silica and a second functional group capable of interacting with the diene elastomer. For example, such a bifunctional compound can comprise a first functional group comprising a silicon atom, said first functional group being capable of interacting with the hydroxyl groups of the silica, and a second functional group comprising a sulfur atom, said second functional group being capable of interacting with the diene elastomer.

Preferentially, the organosilanes are selected from the group consisting of organosilane polysulfides (symmetrical or asymmetrical), such as bis(3-triethoxysilylpropyl) tetrasulfide, abbreviated to TESPT, sold under the name Si69 by Evonik, or bis(triethoxysilylpropyl) disulfide, abbreviated to TESPD, sold under the name Si75 by Evonik, polyorganosiloxanes, mercaptosilanes, blocked mercaptosilanes, such as S-(3-(triethoxysilyl)propyl) octanethioate, sold by Momentive under the name NXT Silane. More preferentially, the organosilane is an organosilane polysulfide.

In the rubber compositions in accordance with the invention, the content of coupling agent is preferentially between 0.5 and 6 phr, more preferentially between 1 and 5 phr.

On a minor basis, the composition may comprise carbon black, for example preferably in a content ranging from 0 to 15 phr, preferably from 0 to 5 phr, and more preferentially from 0.5 to 3 phr.

All carbon blacks, in particular the blacks conventionally used in tires or their treads, are suitable as carbon blacks. Among the latter, mention will more particularly be made of the reinforcing carbon blacks of the 100, 200 and 300 series, or the blacks of the 500, 600 or 700 series (ASTM D-1765-2017 grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks might, for example, be already incorporated in the diene elastomer, in particular isoprene elastomer, in the form of a masterbatch (see, for example, applications WO97/36724-A2 and WO99/16600-A1).

I.4. Crosslinking System

The crosslinking system can be any type of system known to those skilled in the art in the field of rubber compositions for tires. It may in particular be based on sulfur, and/or on peroxide and/or on bismaleimides.

Preferentially, the crosslinking system is based on sulfur; it is then called a vulcanization system. The sulfur can be contributed in any form, in particular in the form of molecular sulfur, or of a sulfur-donating agent. At least one vulcanization accelerator is also preferentially present, and, optionally, also preferentially, use may be made of various known vulcanization activators, such as zinc oxide, stearic acid or equivalent compound, such as stearic acid salts, and salts of transition metals, guanidine derivatives (in particular diphenylguanidine), or also known vulcanization retarders.

The sulfur is used at a preferential content of between 0.5 and 12 phr, preferably from 1 to 10 phr, more preferentially from 1 to 5 phr. The vulcanization accelerator is used at a preferential content of between 0.5 and 10 phr, more preferentially of between 0.5 and 5.0 phr.

Use may be made, as accelerator, of any compound capable of acting as accelerator of the vulcanization of diene elastomers in the presence of sulfur, in particular accelerators of the thiazole type, and also their derivatives, or accelerators of sulfenamide, thiuram, dithiocarbamate, dithiophosphate, thiourea and xanthate types. Mention may in particular be made, as examples of such accelerators, of the following compounds: 2-mercaptobenzothiazyl disulfide (abbreviated to "MBTS"), N-cyclohexyl-2-benzothiazolesulfenamide ("CBS"), N,N-dicyclohexyl-2-benzothiazolesulfenamide ("DCBS"), N-(tert-butyl)-2-benzothiazolesulfenamide ("TBBS"), N-(tert-butyl)-2-benzothiazolesulfenimide ("TB SI"), tetrabenzylthiuram disulfide ("TBZTD"), zinc dibenzyldithiocarbamate ("ZBEC") and the mixtures of these compounds.

I.5. Various Additives

The rubber compositions in accordance with the invention can also comprise all or some of the usual additives and processing aids known to those skilled in the art and generally used in rubber compositions for tires, in particular treads, such as, for example, plasticizers (such as plasticizing oils and/or plasticizing resins), fillers (other than those mentioned above), pigments, protective agents, such as antiozone waxes, chemical antiozonants, antioxidants, antifatigue agents or reinforcing resins (such as described, for example, in application WO 02/10269).

II. Preparation of the Rubber Compositions

The rubber compositions of the invention can be manufactured in appropriate mixers, using two successive phases of preparation well known to those skilled in the art: a first phase of thermomechanical working or kneading ("non-productive" phase) at high temperature, up to a maximum temperature of between 110° C. and 200° C., preferably between 130° C. and 185° C. for a period of time generally of between 2 and 10 minutes; followed by a second phase of mechanical working ("productive" phase) down to a lower temperature, typically of less than 120° C., for example between 40° C. and 100° C., during which finishing phase the crosslinking system is incorporated, and everything is then mixed together for a few minutes, for example between 5 and 15 minutes.

The process for preparing such compositions therefore consists, for example, in incorporating into the elastomers, in particular into the vinylaromatic diene elastomer, during the first step (known as "non-productive"), the reinforcing filler, the PPE resin and the optional other ingredients of the composition with the exception of the crosslinking system, by thermomechanically kneading the whole thing (for example one or more times), until a maximum temperature of between 110° C. and 190° C. is reached; then in cooling everything to a temperature below 100° C.; so as to then incorporate, during the second step (known as "productive"), the crosslinking system and knead the whole thing up to a maximum temperature below 110° C.

The final composition thus obtained can subsequently be calendered, for example in the form of a sheet or of a slab, in particular for a laboratory characterization, or else extruded, for example in order to form a rubber profiled element used in the manufacture of a tire.

The invention relates to the rubber compositions, rubber articles, tires and semi-finished products for tires previously described, both in the green state (that is to say before curing) and in the cured state. (that is to say after crosslinking or vulcanization).

III. Tire of the Invention

The rubber composition according to the invention may be used in different parts of the tire, in particular in the crown, the carcass, the area of the bead, the area of the sidewall and the tread (including especially the underlayer of the tread).

According to a preferred embodiment of the invention, the rubber composition described above can be used in the tire as a stiff elastomer layer in at least one part of the tire.

Elastomer "layer" is understood to mean any three-dimensional component, made of rubber (or "elastomer", the two being regarded as synonyms) composition, having any shape and any thickness, especially sheet, strip or other component having any cross section, for example rectangular or triangular.

First of all, the elastomer layer can be used as tread underlayer positioned in the crown of the tire between, on the one hand, the tread, i.e. the portion intended to come into contact with the road during running, and, on the other hand, the belt reinforcing said crown. The thickness of this elastomer layer is preferably within a range extending from 0.5 to 10 mm, especially within a range from 1 to 5 mm.

According to another preferential embodiment of the invention, the rubber composition according to the invention may be used to form an elastomer layer arranged in the region of the area of the bead of the tire, radially between the carcass ply, the bead wire and the turn-up of the carcass ply.

Another preferential embodiment of the invention can be the use of the composition according to the invention to form an elastomer layer positioned in the area of the sidewall of the tire.

Alternatively, the composition of the invention can advantageously be used in the tread of the tire.

EXAMPLES OF IMPLEMENTATION OF THE INVENTION

A. Preparation of the Compositions

The compositions presented below were prepared according to the procedure described above, in two steps, non-productive step then productive step.

The profiled compositions were optimally crosslinked at a temperature of 160° C.

B. Tests

The rubber compositions can be characterized by their breaking properties, measured as indicated below, representative of the properties observed in tires, in particular for wear resistance and endurance.

The tensile tests make it possible to determine the moduli of elasticity and the properties at break and are based on Standard NF ISO 37 of December 2005.

The nominal secant modulus (or apparent stress, in MPa, relative to the strain, which is unitless) is measured at 23° C. in second elongation (i.e., after an accommodation cycle at the degree of extension provided for the measurement itself) at 10% elongation (denoted MA10).

The stress, in MPa, and the strain at break, in %, are measured at 23° C.

For better readability in the presentation of the results below and easier comparison, the results are given in base 100, the value 100 being set for the control. A result greater than 100 in stress at break or in strain at break indicates an increased value and therefore an improved performance in terms of stress at break or of strain at break, for the composition compared with the control.

C. Testing on Rubber Compositions

Control compositions T1 to T3 are compositions comprising an SBR with a styrene content greater than 10% and/or not comprising any PPE resin. Compositions of this type are known to those skilled in the art in the field of tires. The composition Cl is in accordance with the invention. The formulations (in phr or parts by weight per hundred parts by weight of elastomer) have been represented in Table 1 below.

TABLE 1

| Composition | T1 | T2 | T3 | C1 |
|---|---|---|---|---|
| SBR A (1) | 100 | 100 | — | — |
| SBR B (2) | — | — | 100 | 100 |
| Silica (3) | 26.3 | 28 | 26.3 | 28 |
| Silane (4) | 2 | 2.3 | 2 | 2.3 |
| PPE (5) | — | 6.8 | — | 6.8 |
| Zinc oxide (6) | 3 | 3 | 3 | 3 |
| Stearic acid (7) | 2.5 | 2.5 | 2.5 | 2.5 |
| Accelerator (8) | 2.5 | 2.5 | 2.5 | 2.5 |
| Sulfur | 1 | 1 | 1 | 1 |

SBR A with 15% of styrene units and 24% of 1,2-units for the butadiene part (Tg, measured by DSC according to Standard ASTM D3418, 1999, of −65° C.); SBR B with 3% of styrene units and 12% of 1,2-units for the butadiene part (Tg, measured by DSC according to Standard ASTM D3418, 1999, of −88° C.);

Z1165MP silica from Solvay;

TESPT SI69 silane coupling agent from Evonik;

PPE resin: Poly(2,6-dimethyl-1,4-phenylene ether): Noryl SA90 from Sabic, Mn=2350 g/mol; Zinc oxide (industrial grade—Umicore)

Stearin (Pristerene 4931 from Uniqema)

N-cyclohexylbenzothiazolesulfenamide (Santocure CBS from Flexsys).

The properties of the compositions are represented in Table 2 below.

TABLE 2

| Composition | T1 | T2 | T3 | C1 |
|---|---|---|---|---|
| stress at break 23° C. base 100 | 100 | 96 | 100 | 150 |
| strain at break 23° C. base 100 | 100 | 74 | 100 | 131 |

It is noted that the composition Cl makes it possible to improve both the stress at break and the strain at break compared to the control T3, by virtue of the synergy of an SBR having a styrene content of less than 10% and of a PPE resin. This effect is not produced by the PPE resin in the presence of an SBR having a styrene content greater than 10% as shown by the comparison of T1 and T2. The invention therefore makes it possible to obtain improved tear resistance, better wear resistance and good endurance.

The invention claimed is:

1. A rubber composition based on at least:

a predominant vinylaromatic diene elastomer, having a vinylaromatic content of between 1% and 4% by weight relative to a total weight of a copolymer;

3 to 50 phr of a thermoplastic PPE resin comprising optionally substituted polyphenylene ether units, the thermoplastic PPE resin having a number-average molecular weight (Mn) of less than 6000 g/mol;

5 to 60 phr of silica as predominant reinforcing filler; and a crosslinking system.

2. The rubber composition according to claim 1, wherein the vinylaromatic diene elastomer is selected from the group consisting of butadiene/styrene copolymers, isoprene/styrene copolymers and butadiene/isoprene/styrene copolymers and mixtures thereof.

3. The rubber composition according to claim 1, wherein the vinylaromatic diene elastomer present has a Tg within a range extending from −110° C. to −70° C.

4. The rubber composition according to claim 1, wherein a content of vinylaromatic diene elastomer is within a range extending from 70 to 100 phr, parts by weight per hundred parts of elastomer.

5. The rubber composition according to claim 1, wherein a content of vinylaromatic diene elastomer is 100 phr.

6. The rubber composition according to claim 1, wherein the thermoplastic PPE resin has a number-average molecular weight (Mn) of less than 3500 g/mol.

7. The rubber composition according to claim 1, wherein the thermoplastic PPE resin has a glass transition temperature (Tg), measured by DSC according to Standard ASTM D3418 of 1999, within a range extending from 0 to 170° C.

8. The rubber composition according to claim 1, wherein the thermoplastic PPE resin is a compound comprising predominantly polyphenylene units of general formula (I):

(I)

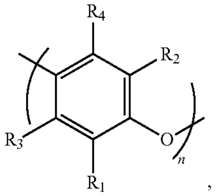

, in which:

$R_1$, $R_2$, $R_3$ and $R_4$ represent, independently of one another, identical or different groups selected from hydrogen, hydroxy, alkoxy, halogen, amino, alkylamino groups, dialkylamino groups and hydrocarbon-based groups comprising at least 1 carbon atom, optionally interrupted by heteroatoms and optionally substituted; $R_1$ and $R_3$ on the one hand, and $R_2$ and $R_4$ on the other, possibly forming, together with the carbon atoms to which they are attached, one or more rings fused to the benzene ring of the compound of formula (I), and n is an integer within a range extending from 3 to 300.

9. The rubber composition according to claim 8, wherein the thermoplastic PPE resin is a compound comprising predominantly polyphenylene units of general formula (I) in which $R_1$, $R_2$, $R_3$ and $R_4$ represent, independently of one another, identical or different groups selected from:

hydrogen, hydroxyl groups, alkoxy groups comprising from 1 to 6 carbon atoms, halogen groups, amino groups, alkylamino groups comprising from 1 to 6 carbon atoms and dialkylamino groups comprising from 2 to 12 carbon atoms, linear, branched or cyclic alkyl groups, comprising from 1 to 12 carbon atoms, which are optionally interrupted by heteroatoms and optionally substituted by hydroxyl groups, alkoxy groups comprising from 1 to 6 carbon atoms, amino groups, alkylamino groups comprising from 1 to 6 carbon atoms, dialkylamino groups comprising from 2 to 12 carbon atoms, and halogen groups, and aryl groups comprising from 6 to 18 carbon atoms which are optionally substituted by hydroxyl groups, alkoxy groups comprising from 1 to 6 atoms, amino groups, alkylamino groups comprising from 1 to 6 atoms, dialkylamino groups comprising from 2 to 12 carbon atoms, alkyl groups comprising from 1 to 12 carbon atoms, and halogen groups.

10. The rubber composition according to claim 8, wherein $R_1$ and $R_2$ represent an alkyl group and $R_3$ and $R_4$ represent hydrogen atoms.

11. The rubber composition according to claim 1, wherein the content of the thermoplastic PPE resin is within a range extending from 3 to 40 phr.

12. The rubber composition according to claim 1, wherein the content of silica is within a range extending from 10 to 50 phr.

13. A finished or semi-finished rubber item comprising the rubber composition according to claim 1.

14. A tire comprising the rubber composition according to claim 1.

* * * * *